(12) United States Patent
Hirooka

(10) Patent No.: US 7,610,140 B2
(45) Date of Patent: Oct. 27, 2009

(54) VEHICULAR EJECTOR SYSTEM AND CONTROL METHOD THEREOF

(75) Inventor: Shigemasa Hirooka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 375 days.

(21) Appl. No.: 11/808,234

(22) Filed: Jun. 7, 2007

(65) Prior Publication Data

US 2007/0295303 A1    Dec. 27, 2007

(30) Foreign Application Priority Data

Jun. 9, 2006    (JP)    ............... 2006-160823

(51) Int. Cl.
*G06F 19/00* (2006.01)
*F02D 41/08* (2006.01)

(52) U.S. Cl. .................. 701/103; 123/339.11; 123/585

(58) Field of Classification Search ............ 123/339.11, 123/339.14, 339.19, 399.23, 184, 21, 399, 123/403, 585, 586; 701/101–103, 110, 115; 303/113.4

See application file for complete search history.

(56) References Cited

U.S. PATENT DOCUMENTS

| | | | | |
|---|---|---|---|---|
| 5,098,171 A | * | 3/1992 | Siegel ..................... | 303/113.4 |
| 5,233,908 A | * | 8/1993 | Gautier et al. ............ | 91/376 R |
| 6,315,693 B1 | * | 11/2001 | Tayama ...................... | 477/46 |
| 6,951,199 B2 | * | 10/2005 | Suzuki .................. | 123/339.11 |
| 7,174,883 B2 | * | 2/2007 | Sonoda et al. ............. | 123/586 |
| 2008/0015769 A1 | * | 1/2008 | Hirooka ...................... | 701/101 |
| 2009/0043477 A1 | * | 2/2009 | Oi et al. ...................... | 701/103 |

FOREIGN PATENT DOCUMENTS

| JP | A 62-214245 | 9/1987 |
|---|---|---|
| JP | A-9-072226 | 3/1997 |
| JP | A-11-342840 | 12/1999 |
| JP | A-2004-243837 | 9/2004 |
| JP | A-2004-285838 | 10/2004 |
| JP | A 2005-069175 | 3/2005 |
| JP | A-2005-201196 | 7/2005 |
| JP | A-2006-118385 | 5/2006 |
| JP | A-2006-118495 | 5/2006 |

\* cited by examiner

*Primary Examiner*—Willis R Wolfe, Jr.
(74) *Attorney, Agent, or Firm*—Oliff & Berridge, PLC

(57) ABSTRACT

A vehicular ejector system having an ejector that generates a negative pressure that is greater than the intake manifold negative pressure that is to be extracted from an intake manifold, a VSV that causes the ejector to function or stop functioning, and an ECU that controls the VSV. The ECU includes a control device that controls the VSV so as to cause the ejector to function if an ISC request amount for controlling, during idling, a throttle valve that adjusts the intake air flow amount supplied to the internal combustion engine is greater than a predetermined amount.

8 Claims, 11 Drawing Sheets

EJECTOR SYSTEM 100A: 1, 30, 40A

EJECTOR SYSTEM 100A: 1, 30, 40A

| NE | · · · | · · · | · · · |
|---|---|---|---|
| PREDETERMINED AMOUNT α | · · · | · · · | · · · |

VEHICULAR EJECTOR SYSTEM AND CONTROL METHOD THEREOF

INCORPORATION BY REFERENCE

The disclosure of Japanese Patent Application No. 2006-160823 filed on Jun. 9, 2006 including the specification, drawings and abstract is incorporated herein by reference in its entirety.

BACKGROUND OF THE INVENTION

1. Field of the Invention

The invention relates to a vehicular ejector system and a control method thereof. More particularly, the invention relates to a vehicular ejector system capable of causing an ejector to function suitably and cost efficiently during idling.

2. Description of the Related Art

In vehicles, an ejector has been used to supply a negative pressure chamber of a brake booster with a negative pressure that is greater than the negative pressure (hereinafter, also referred to simply as "the negative pressure in the intake system") that is to be extracted from an intake passageway of an intake system of an internal combustion engine (hereinafter, also referred to simply as "the intake system of the internal combustion engine") that connects in communication from the atmosphere to the cylinders of the engine. Generally, the ejector is disposed in a bypass that bypasses the throttle valve, and generates great negative pressure due to the venturi effect. With regard to the ejector, for example, Japanese Patent Application Publication No. 62-214245 proposes a negative pressure source device of negative pressure booster that employs an ejector. This negative pressure generator device employs a pressure sensor that detects that the negative pressure of the negative pressure chamber has become less than or equal to a predetermined value. Furthermore, Japanese Patent Application Publication No. 2005-69175 proposes a vehicular control device that has correction means for correcting the intake air amount taken into the internal combustion engine on the basis of the state of operation of the ejector.

Generally, the negative pressure in the intake system becomes the greatest at the time of idling. Therefore, the negative pressure in the negative pressure chamber (hereinafter, also referred to simply as "the booster negative pressure") is secured in a magnitude that is sufficient at the time of idling. When the ejector is not functioning, the brake booster directly extracts the negative pressure from the intake system. The magnitude of the negative pressure in the intake system varies under various conditions while the engine remains in the idling state. That is, in some cases during idling, the negative pressure in the intake system can be small and insufficient in terms of the magnitude of the booster negative pressure. In such a case, the assist force of the brake booster declines, so that the operation burden on the driver increases.

If a pressure sensor that directly detects the booster negative pressure is utilized, the magnitude of the negative pressure in the negative pressure chamber of the brake booster can easily be grasped. Therefore, the provision of such a pressure sensor is favorable in causing the ejector to function so as to supply the brake booster with increased negative pressure when the negative pressure in the intake system is small. It can be said that it suffices to cause the ejector to function when the negative pressure in the intake system is small, in order to secure a sufficient magnitude of the booster negative pressure. However, providing a vehicle with such pressure sensors to cause the ejector to function will naturally result in a corresponding increase in the cost of the vehicle.

SUMMARY OF THE INVENTION

It is an object of the invention to provide a vehicular ejector system capable of reducing the cost of a vehicle by eliminating the need for a pressure sensor in causing an ejector function during idling, and capable of causing the ejector to more suitably function in securing a sufficient magnitude of the booster negative pressure during idling, or capable of preventing undesirable effects that occur in the case where the ejector actually does not function due to freezing.

A first aspect of the invention relates to a vehicular ejector system having an ejector that generates a negative pressure that is greater than the negative pressure that is to be extracted from an intake passageway of an intake system of the internal combustion engine, a state change device that causes the ejector to function or stop functioning, and a control device that controls the state change device. The control device has a flow amount adjustment device that adjusts an intake air flow amount supplied to the internal combustion engine. When an ISC (Idle Speed Control) request amount for controlling idle rotation speed during idling is greater than a predetermined amount, the control device controls the state change device so as to cause the ejector function. Generally, during idling, an ISC control of controlling the idle rotation speed is performed by controlling the flow amount adjustment device such as an ISC valve, a throttle valve, etc. When the flow amount adjustment device is controlled with the ISC request amount that is greater than or equal to the predetermined amount, the intake passageway is opened to a corresponding extent. That is, in this case, the negative pressure in the intake system also declines to a corresponding extent.

According to the aspect of the invention, the need to use a pressure sensor in causing the ejector to function is eliminated, and therefore the cost of the vehicle can be reduced. Furthermore, according to the invention, since the ISC request amount is utilized in causing the ejector to function, it is possible to cause the ejector to function suitably in terms of responsiveness in comparison with the case where the state is detected by using a pressure sensor or the like. The intake air flow amount increases when the ejector is caused to function. However, when the flow amount adjustment device is being controlled with the ISC request amount that is greater than or equal to the predetermined amount, the degree of fluctuation of the intake air flow amount also relatively decreases. Therefore, according to the invention, it is possible to cause the ejector to suitably function without causing excessive adverse effect on the idle rotation speed.

The first aspect of the invention may further include a predetermined amount correction portion that corrects the predetermined amount relating to the ISC request amount in accordance with a condition in which a pressure difference that causes the ejector to generate negative pressure changes although a state of the flow amount adjustment device remains the same. Concretely, examples of the case where the "state of the flow amount adjustment device remains the same" include the case where although the degree of opening of the throttle valve remains the same, the pressure difference that causes the ejector to generate negative pressure changes, the case where although the degree of opening of the throttle valve remains the same, the magnitude of the negative pressure in the intake system changes, the case where although the degree of opening of the throttle valve remains the same, the pressure on the upstream side of the throttle valve changes, etc. If the pressure difference that causes the ejector to generate negative pressure is small, the negative pressure that can be generated by the ejector when the ejector is caused to function becomes correspondingly small, and therefore, the magnitude of the booster negative pressure that can be secured also becomes correspondingly small. Therefore, when the ISC request amount is greater than or equal to the predetermined amount and the pressure difference becomes smaller, it is recommendable to cause the ejector to function in a stage where the ISC request amount is relatively small. In this respect, according to this aspect of the invention, by correcting the predetermined amount to a value that is smaller the smaller the pressure difference becomes, a sufficient magnitude of the booster negative pressure can be secured, and thus the ejector can be caused to more suitably function.

In the first aspect of the invention, the condition in which the pressure difference changes may be based on the magnitude of the rotation speed of the internal combustion engine. More concretely, for example, even when the state of the flow amount adjustment device remains the same, the negative pressure in the intake system becomes smaller the smaller the rotation speed of the internal combustion engine is. That is, the pressure difference that generates negative pressure in the ejector becomes small. Therefore, when the rotation speed of the internal combustion engine is small, it is more suitable to cause the ejector to function in a stage where the ISC request amount is smaller. According to this aspect taking these respects into account, correcting the predetermined amount to a smaller value if the rotation speed of the internal combustion engine is smaller makes it possible to cause the ejector to more suitably function in securing a sufficient magnitude of the booster negative pressure.

In this aspect, the condition in which the pressure difference changes may be based on the magnitude of the atmospheric pressure. Even where the ISC request amount remains the same, the pressure difference that causes the ejector to generate negative pressure becomes smaller if the atmospheric pressure is small. Therefore, when the atmosphere pressure is small, it is more suitable to cause the ejector to function in a stage where the ISC request amount is more small. According to this aspect taking these respects into account, since the predetermined amount is corrected to a smaller amount if the atmospheric air pressure is smaller, it is possible to cause the ejector to function more suitably in securing a sufficient magnitude of the booster negative pressure.

Furthermore, in this aspect, the foregoing condition may be based on the degree of opening of an air flow control valve that is disposed in the intake passageway of the intake system of the internal combustion engine. If the intake passageway is provided with an air flow control valve for generating a turning air flow, such as a tumble flow or a swirl flow, within the combustion chamber, the negative pressure in the intake system changes in accordance with the degree of opening of the air flow control valve as well. Furthermore, in some cases, the flow amount adjustment device is designed so that during idling the flow amount adjustment device operates in cooperation with the air flow control valve, in accordance with the degree of opening of the air flow control valve. Concretely, for example, if the air flow control valve is closed during idling, the intake air flow amount supplied to the internal combustion engine correspondingly declines. Therefore, in some cases, the throttle valve is designed so as to be opened to supplement the intake air amount. In such a case, the negative pressure of the intake system declines to a great extent. Therefore, when the negative pressure in the intake system becomes smaller in accordance with the opening degree of the air flow control valve, it is more suitable to cause the ejector to function in a stage where the ISC request amount is smaller. According to the aspect taking these respects into account, correcting the predetermined amount in accordance with the opening degree of the air flow control valve makes it possible to cause the ejector to more suitably function in securing a sufficient magnitude of the booster negative pressure.

Furthermore, in this aspect, the control device may include a control prohibition portion that prohibits the control device from controlling the state change device so as to cause the ejector to function if water temperature of a cooling water of the internal combustion engine is less than or equal to a predetermined temperature. It is to be noted herein that in an internal channel of the ejector that is a portion where negative pressure is generated on the basis of the venturi effect, dew condensation is likely to occur and freeze since the high-speed jet flow reduces temperature. Furthermore, since the internal channel is constricted to a small opening size, the freezing is likely to make a clog that impedes the function of the ejector. In this respect, it is conceivable that if the booster negative pressure is directly detected, the detection of presence/absence of freezing can also be detected. However, when there is freezing, the ejector cannot be caused to operate. In the meantime, in the case where the intake air amount is corrected by an estimated value that is in accordance with the increasing intake air flow amount if the ejector is caused to function as proposed in, for example, Japanese Patent Application Publication No. JP-A-2005-69175, a state that is unmatched with respect to the intake air flow amount occurs if causing the ejector to function is attempted despite the freezing. That is, in this case, the idle control or the air-fuel ratio control are inappropriately performed. However, in this embodiment, it is possible to prevent undesirable effects that occur in the case where the ejector actually does not function due to freezing.

According to the invention, it is possible to provide a vehicular ejector system capable of reducing the cost of a vehicle by eliminating the need for a pressure sensor in causing an ejector function during idling, and capable of causing the ejector to more suitably function in securing a sufficient magnitude of the booster negative pressure, or capable of preventing undesirable effects that occur in the case where the ejector actually does not function due to freezing.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Best modes for carrying out the invention will be described hereinafter with reference to the drawings.

Embodiment 1

Figure 1:
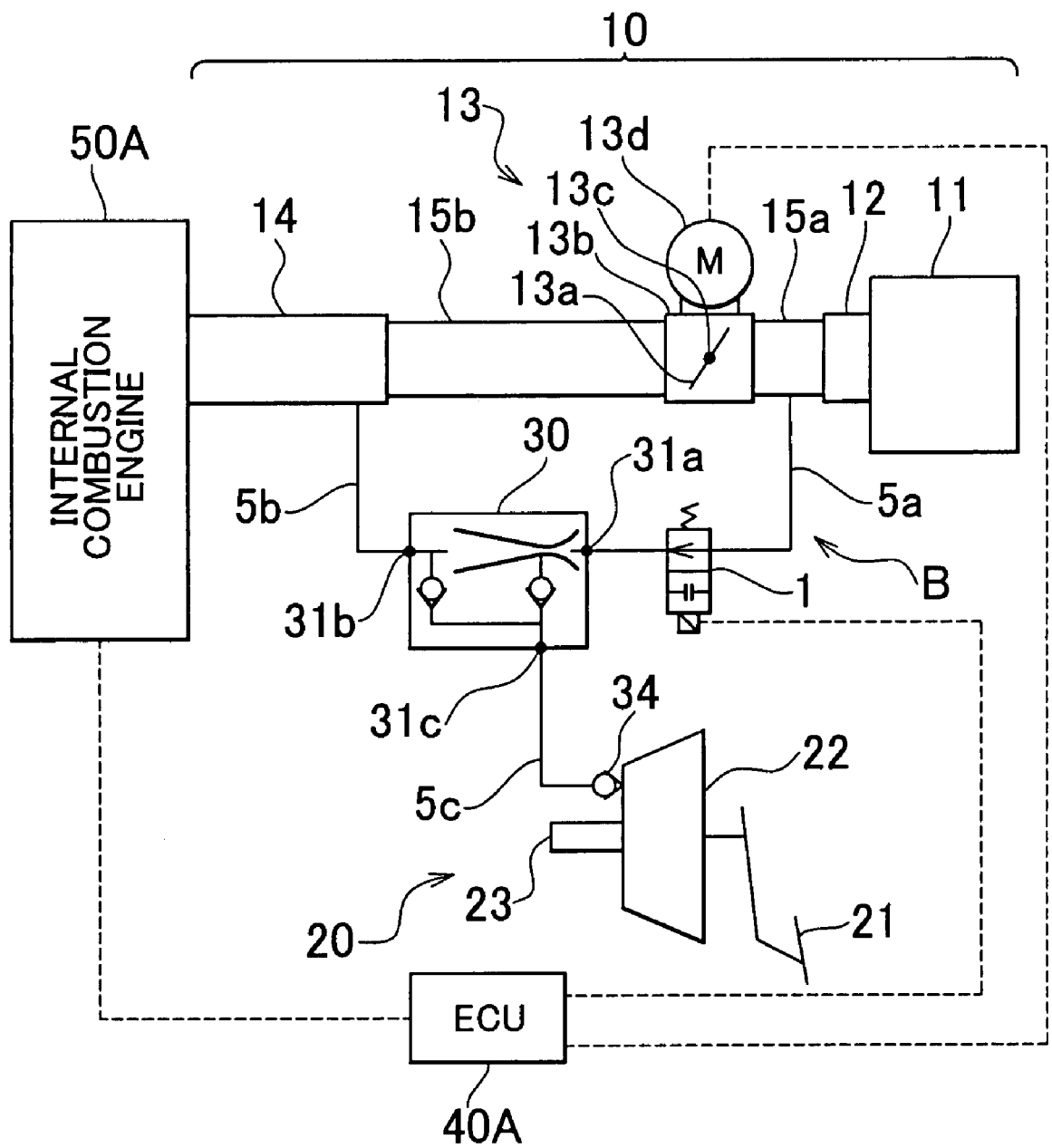
FIG. 1 is a schematic diagram showing an ejector system 100A.

FIG. 1 is a schematic diagram showing a vehicular ejector system (hereinafter, referred to simply as "ejector system") in accordance with an embodiment of the invention. Various components shown in FIG. 1, including an internal combustion engine 50A, are mounted in a vehicle (not shown). An intake system 10 of the internal combustion engine 50A has an air cleaner 11, an air flow meter 12, an electric throttle 13, an intake manifold 14, intake ports communicating with cylinders (not shown) of the internal combustion engine 50A, including an intake port 51 (see FIG. 7), components, for example, intake pipes 15a, 15b and the like, which are disposed as appropriate between the foregoing components or parts, etc. The air cleaner 11 is a component provided for filtering intake air that is to be supplied to the cylinders of the internal combustion engine 50A, and communicates with the atmosphere via an air duct (not shown). The air flow meter 12 is a component provided for measuring the amount of flow of intake air, and outputs a signal corresponding to the intake air flow amount.

The electric throttle 13 has a throttle valve 13a, a throttle body 13b, a valve shaft 13c, and an electric motor 13d. The throttle valve 13a is a component provided for adjusting the total intake air flow amount supplied to the cylinders of the internal combustion engine 50 by changing its degree of opening. In this embodiment, the electric throttle 13 is a component provided for adjusting the intake air flow amount in order to control the idle rotation speed. In this embodiment, the electric throttle 13 may realize a flow amount adjustment device. The throttle body 13b is a component made of a tubular member through which an intake passageway is formed. The throttle body 13b supports the valve shaft 13c of the throttle valve 13a that is disposed in the intake passageway. The electric motor 13d is a component provided for changing the opening degree of the throttle valve 13a. The electric motor 13d is a stepping motor. The electric motor 13d is fixed to the throttle body 13b, and an output shaft (not shown) of the electric motor 13d is linked to the valve shaft 13c. The opening degree of the throttle valve 13a is detected by an ECU 40A on the basis of the output signals of an encoder (not shown) that is provided within the electric throttle 13 (hereinafter, referred to simply as "encoder").

As for the throttle mechanism, it is preferable to apply a throttle-by-wire system as in the electric throttle 13 in which the throttle valve 13a is driven by an actuator. However, this is not restrictive. For example, the electric throttle 13 may be replaced by a mechanical throttle mechanism that is linked to an accelerator pedal (not shown) via a linking cable or the like so that the opening degree of the throttle valve 13a is changed in cooperation with the accelerator pedal. In this case, the control of idle rotation speed can be achieved by, for example, forming a bypass around the throttle valve 13a and disposing in the bypass a so-called ISC valve capable of controlling the degree of closure of the channel. The intake manifold 14 is a component provided for dividing a single intake passageway on the upstream side into branches on the downstream side corresponding to the cylinders of the internal combustion engine 50 and thus distributing intake air to the cylinders of the internal combustion engine 50.

The brake device 20 has a brake pedal 21, a brake booster 22, a master cylinder 23, and wheel cylinders (not shown). The brake pedal 21 that a driver operates in order to brake rotation of the wheels is linked to an input rod (not shown) of the brake booster 22. The brake booster 22 is a component provided for generating assist force at a predetermined boost ratio to the pedal depression force. A negative pressure chamber (not shown) partitioned at the master cylinder 23 side within the brake booster 22 is connected to the intake passageway of the intake manifold 14 via an ejector 30. An output rod (not shown) of the brake booster 22 is linked to an input shaft (not shown) of the master cylinder 23. The master cylinder 23 generates hydraulic pressure in accordance with the acting force from the brake booster 22, which obtains an assist force in addition to the pedal depression force. The master cylinder 23 is connected to each of wheel cylinders provided in brake mechanisms (not shown) of the wheels via a hydraulic circuit. Each wheel cylinder generates brake force from the hydraulic pressure supplied from the master cylinder 23. The brake booster 22 is not particularly limited but may be a generally employed type as long as it is of a pneumatic type.

The ejector 30 is a component provided for generating a negative pressure that is even greater than the negative pressure that is to be extracted from the intake system 10 and, more concretely, the intake manifold 14 (hereinafter, referred to simply as "intake manifold negative pressure"), and for supplying the negative pressure to the negative pressure chamber of the brake booster 22. The ejector 30 has an inflow port 31a, an outflow port 31b, and a negative pressure supply port 31c. Among these, the negative pressure supply port 31c is connected to the negative pressure chamber of the brake booster 22 via an air hose 5c. Furthermore, the inflow port 31a is connected to the intake passageway of the intake pipe 15a by an air hose 5a, and the outflow port 31b is connected to the intake passageway of the intake manifold 14 by an air hose 5b so that the inflow port 31a and the outflow port 31b are connected to the intake passageway astride the electric throttle 13, more concretely, the throttle valve 13a. Thus, a bypass B bypassing the electric throttle 13 is formed by the air hoses 5a, 5b, including the ejector 30. When the ejector 30 is not functioning, the negative pressure chamber of the brake booster 22 is supplied with negative pressure from the intake passageway of the intake manifold 14 via the air hose 5b, the outflow port 31b of the ejector 30, the negative pressure supply port 31c, and an air hose 5c.

The air hose 5a is provided with a VSV (vacuum switching valve) 1. The VSV 1 is a component for opening and closing the bypass B under the control of the ECU 40A. In this embodiment, the VSV 1 is a normally closed 2-position-2-port solenoid valve. However, this is not restrictive, and the VSV 1 may be another suitable type of valve, for example, an electromagnetic valve or the like. Furthermore, the VSV 1 may also be a flow amount adjustment valve capable of controlling the degree of closure of the channel, or the like. Furthermore, the VSV 1 is a component provided for causing the ejector 30 to function or stop functioning by opening or closing the bypass B. In this embodiment, the VSV 1 may serve as a state change device.

Figure 2:
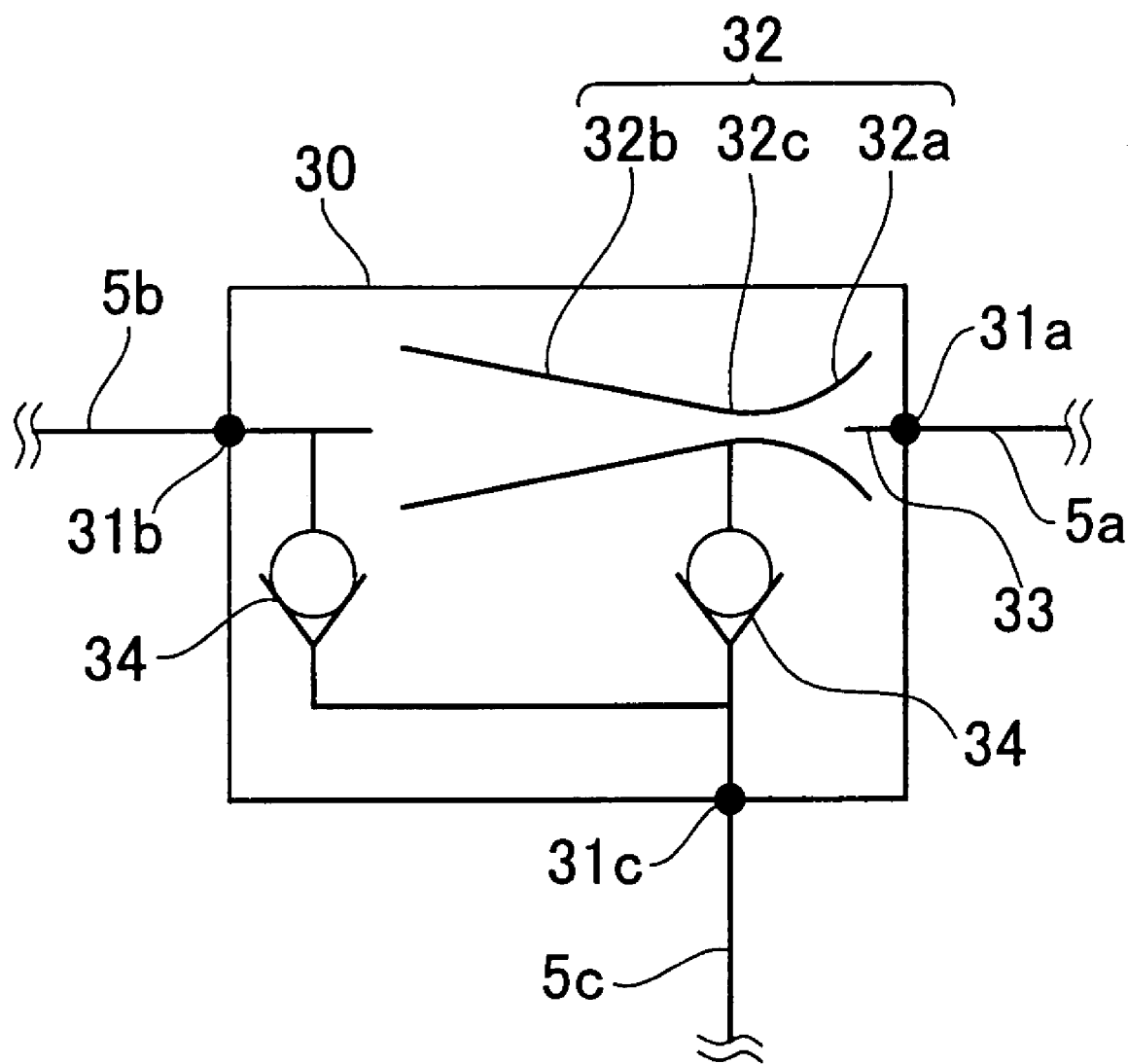
FIG. 2 is a schematic diagram showing an internal construction of an ejector 30.

FIG. 2 is a schematic diagram showing an internal construction of the ejector 30. The ejector 30 has a diffuser 32 therein. The diffuser 32 is constructed of a convergent portion 32a, a divergent portion 32b, and a negative pressure extraction portion 32c that is a passageway connecting the convergent portion 32a and the divergent portion 32b in communication. The convergent portion 32a has an opening that faces the inflow port 31a, and the divergent portion 32b has an opening that faces the outflow port 31b. The negative pressure extraction portion 32c communicates with the negative pressure supply port 31c. The inflow port 31a is provided with a nozzle 33 that jets the intake air that has flown in, to the convergent portion 32a. The intake air jetted from the nozzle 33 flows through the diffuser 32, and then flows out of the outflow port 31b into the air hose 5b. At this time, a high-speed jet flow is caused in the diffuser 32, so that due to the venturi effect, a great negative pressure occurs in the negative pressure extraction portion 32c. This negative pressure is supplied from the negative pressure supply port 31c to the negative pressure chamber via the air hose 5c. Due to this function of the ejector 30, the brake booster 22 can obtain a negative pressure that is greater than the negative pressure that is extracted from the intake manifold 14. Check valves 34 provided in an internal channel between the negative pressure extraction portion 32c and the negative pressure supply port 31c, an internal channel between the outflow port 31b and the negative pressure supply port 31c, and a connecting portion of the brake booster 22 to the air hose 5c shown in FIG. 1 are valves for preventing reverse flow. The ejector 30 is not limited to an ejector that has an internal construction as shown in FIG. 2, but may also be replaced by an ejector that has a different internal construction.

The ECU 40A has a CPU (Central Processing Unit), a ROM (Read-Only Memory), a RAM (Random Access Memory), an input/output circuit, etc. The ECU 40A is mainly a component provided for controlling the internal combustion engine 50, and in this embodiment controls the electric throttle 13 and the VSV 1 as well. The electric throttle 13, the VSV 1 and other various control objects are connected to the ECU 40A via drive circuits (not shown). Furthermore, various sensors, including an encoder, an accelerator sensor (not shown) for detecting the state of the accelerator pedal, a crank angle sensor (not shown) for detecting the rotation speed NE of the internal combustion engine 50, a water temperature sensor (not shown) for detecting the water temperature of cooling water of the internal combustion engine, an atmospheric pressure sensor (not shown) for detecting the atmospheric pressure, are connected to the ECU 40A. In this embodiment, the ECU 40A may serve as a control device.

The ROM is a component for storing programs that describe the various processes that are executed by the CPU. In this embodiment, a program for controlling the internal combustion engine 50, an ISC-controlling program for performing the ISC control of the electric throttle 13 on the basis of the ISC request amount, a VSV 1-controlling program for controlling the VSV 1 so as to cause the ejector 30 to function if the ISC request amount is greater than or equal to a predetermined amount or cause the ejector 30 to stop functioning, etc. are also stored in the ROM. These programs may be integrally combined. In this embodiment, the ISC request amounts include a F/B control amount for performing feedback (hereinafter, also referred to as "F/B") control of the electric throttle 13 so as to restrain fluctuation of the intake air flow amount, a learning control amount for performing learning-control of the electric throttle 13 so as to keep the intake air flow amount equal to a target intake air flow amount on the basis of a result of the F/B control, a correction control amount for performing correction control of the electric throttle 13 so as to change the target rotation speed in accordance with the electric load and the external load that acts on the internal combustion engine 50A, a water temperature correction amount for changing the target rotation speed in accordance with the degree of the water temperature of the cooling water of the internal combustion engine, and an ignition timing retardation correction amount for changing the target rotation speed in accordance with the amount of retardation of the ignition timing. In this embodiment, calculation programs for calculating these various control amounts and the ISC request amounts are incorporated into the ISC-controlling programs. In this embodiment, the CPU, the ROM and the RAM (hereinafter, also referred to as "CPU and the like") and the aforementioned various programs may realize various detection devices and determination portions and the like. In particular, the CPU and the like and the VSV 1-controlling program may serve as a control device. In this embodiment, the VSV 1, the ejector 30 and the ECU 40A may serve as the ejector system 100A.

Figure 3:
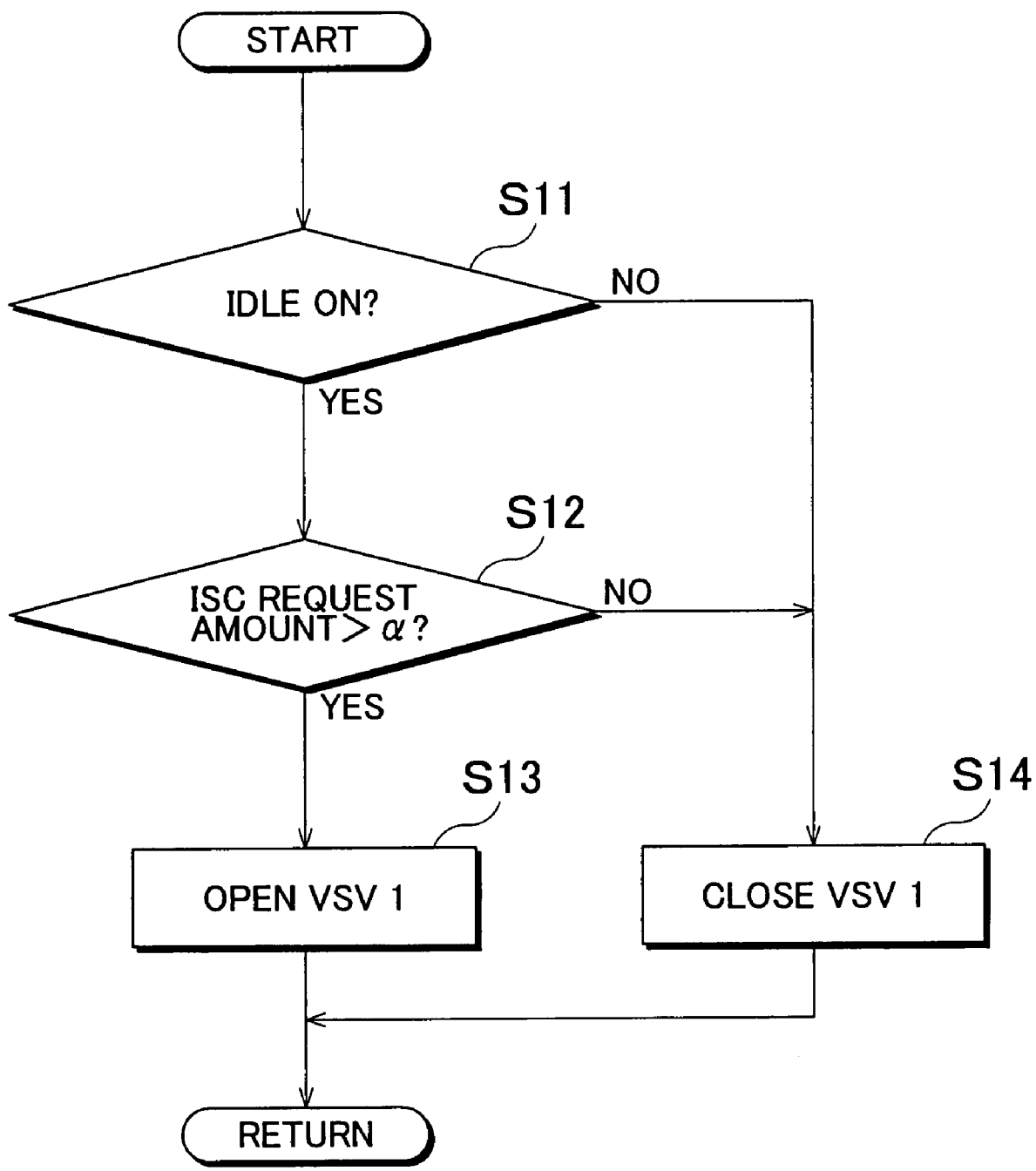
FIG. 3 is a flowchart showing a process performed by an ECU 40A.

Next, a process executed by the ECU 40A to cause the ejector 30 so as to secure a sufficient magnitude of booster negative pressure during idling will be described using a flowchart shown in FIG. 3. The ECU 40A controls the VSV 1 by the CPU executing the process shown by the flowchart in a very short cycle time on the basis of the VSV 1-controlling program and the like stored in the ROM. The CPU executes a process of determining whether or not the idle control is being performed (hereinafter, also described simply as "the idle control is on") (step 11). Whether or not the idle control is on can be determined by, for example, the CPU checking the state of an internal process based on the internal combustion engine 50 control-purpose program that is being performed by the ECU 40A. If an affirmative determination is made in step 11, the CPU executes a process of determining whether or not the ISC request amount is greater than a predetermined amount α (step 12). If the throttle valve 13a is controlled on the basis of the ISC request amount that is greater than or equal to the predetermined amount a, the intake passageway is opened to a corresponding degree, and the intake manifold negative pressure also declines by a corresponding amount. Therefore, in this step, the determination performed on the basis of the ISC control amount may realize the elimination of the need for a pressure sensor and the like that directly detects the intake manifold negative pressure, and the booster negative pressure.

If an affirmative determination is made in step 12, the CPU executes a process for electrifying the VSV 1, that is, a process for controlling the VSV 1 so as to cause the ejector 30 to function, and thus opens the VSV 1 (step 13). This makes the ejector 30 to function, and therefore a sufficient magnitude of the booster negative pressure can be secured. On the other hand, if a negative determination is made in step 11, that is, if the idle control is off, the CPU executes a process for stopping the electrification of the CPU, that is, a process of stopping the ejector 30 from functioning, and thus closes the VSV 1 (step 14). Likewise, if a negative determination is made in step 12, the CPU also executes a process of stopping the electrification. Incidentally, if the VSV 1 has already been opened in step 13, or if the VSV 1 has already been closed in step 14, the step may be skipped. As described above, by eliminating the need for a pressure sensor in causing the ejector 30 to function during idling, it is possible to realize a vehicular ejector system 100A capable of reducing the cost of the vehicle.

Embodiment 2

An ejector system 100B in accordance with this embodiment is the same as the ejector system 100A in accordance with Embodiment 1, except that the ejector system 100B has an ECU 40B in place of the ECU 40A. The vehicular constructions to which the ejector system 100B is applied are the same as the constructions shown in FIG. 1 except for the ECU 40A. The ECU 40B is the same as the ECU 40A, except that a first predetermined amount correction-purpose program for correcting the predetermined amount α in accordance with the magnitude of the rotation speed NE detected on the basis of the output signal of a crank angle sensor is stored in the ROM. In this embodiment, the CPU and the like and the first predetermined amount correction-purpose program may realize a first predetermined amount correction portion, and the VSV 1, the ejector 30 and the ECU 40B may serve as the ejector system 100B.

Figure 4:
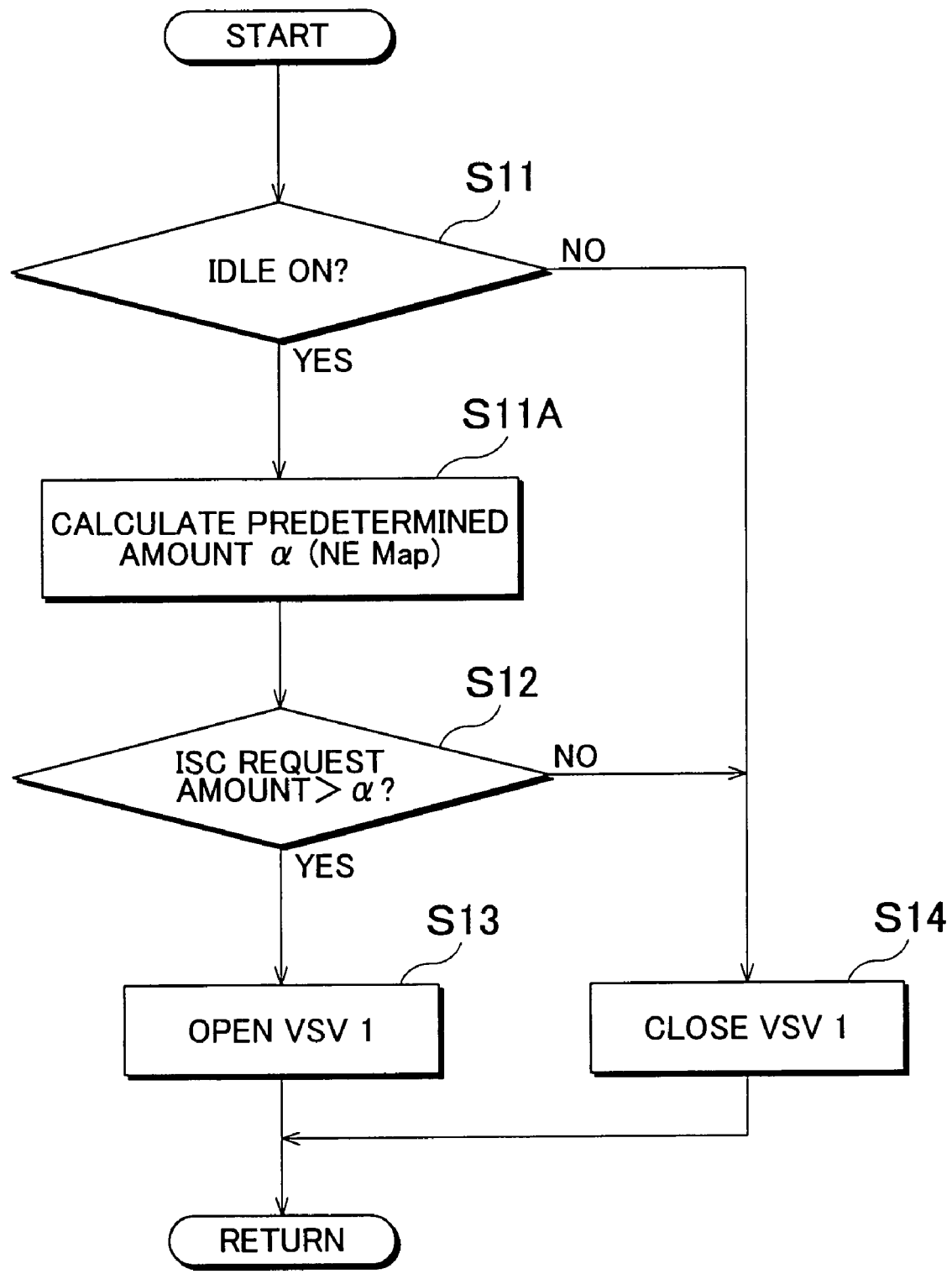
FIG. 4 is a flowchart showing a process performed by an ECU 40B.
Figure 5:
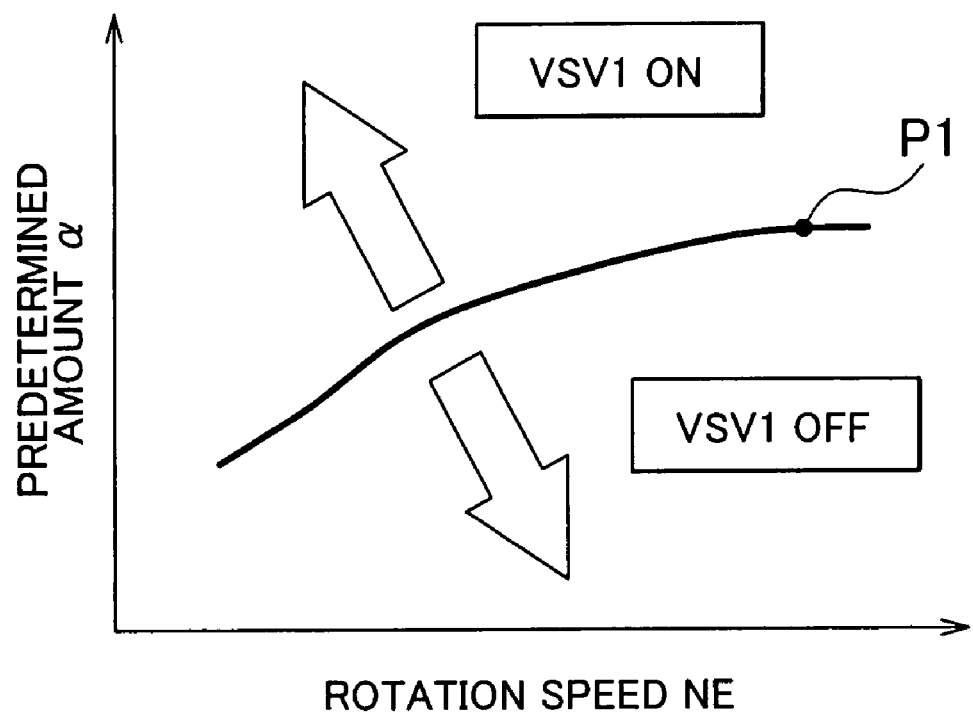
FIG. 5 is a schematic diagram showing map data (NE map) of a predetermined amount α.

Next, a process executed by the ECU 40B in causing the ejector 30 to more suitably function so as to secure a sufficient magnitude of the booster negative pressure during idling will be described with reference to the flowchart shown in FIG. 4. The flowchart shown in FIG. 4 is the same as the flowchart shown in FIG. 3, except that step 11A is added. In the following description of this embodiment, only step 11A will be described in detail. If an affirmative determination is made in step 11, the CPU executes a process of calculating a predetermined amount α (step 11A). FIG. 5 is a schematic diagram showing map data of the predetermined amount α set in accordance with the rotation speed NE (hereinafter, also referred to simply as "NE map"). The following description will be made with reference to the predetermined amount α that corresponds to a point P1 in FIG. 5. If the rotation speed NE becomes smaller than a rotation speed NE that corresponds to the point P1 while the degree of throttle opening remains the same, the intake manifold negative pressure further declines. In this respect, it can be understood that the intake manifold negative pressure becomes unable to provide a sufficient magnitude of the booster negative pressure. Furthermore, if the intake manifold negative pressure declines, the pressure difference across the throttle valve 13a, that is, the pressure difference that causes the negative pressure in the ejector 30, becomes also small. Therefore, in this case, it is more suitable to open the VSV 1 before the intake manifold negative pressure declines, that is, to open the VSV 1 in a stage where the ISC request amount is relatively small, in view of securing a sufficient magnitude of the booster negative pressure.

Therefore, in this embodiment, the NE map is stored in the ROM, and the predetermined amount α is set in the NE map so as to become smaller the smaller the rotation speed NE becomes. In step S11A, on the basis of the detected rotation speed NE, the CPU refers to the NE map, so as to correct the predetermined amount α in accordance with the rotation speed NE. Therefore, in step 12, the determination is made through the use of the corrected predetermined amount α, so that the booster negative pressure is secured more suitably. Thus, it is possible to realize the vehicular ejector system 100B capable of reducing the cost of the vehicle and also capable of causing the ejector 30 to more suitably function in securing a sufficient magnitude of the booster negative pressure.

Embodiment 3

An ejector system 100C in accordance with this embodiment is the same as the ejector system 100B in accordance with Embodiment 2, except that the ejector system 100C has an ECU 40C in place of the ECU 40B. The vehicular constructions to which the ejector system 100C is applied are the same as the constructions shown in FIG. 1 except for the ECU 40A. The ECU 40C is the same as the ECU 40B, except that a second predetermined amount correction-purpose program for correcting the predetermined amount α in accordance with the atmospheric pressure detected on the basis of the output signal of an atmospheric pressure sensor is also stored in the ROM. In this embodiment, the CPU and the like and the second predetermined amount correction-purpose program may realize a second predetermined amount correction portion, and the VSV 1, the ejector 30 and the ECU 40C may realize the ejector system 100C.

Figure 6:
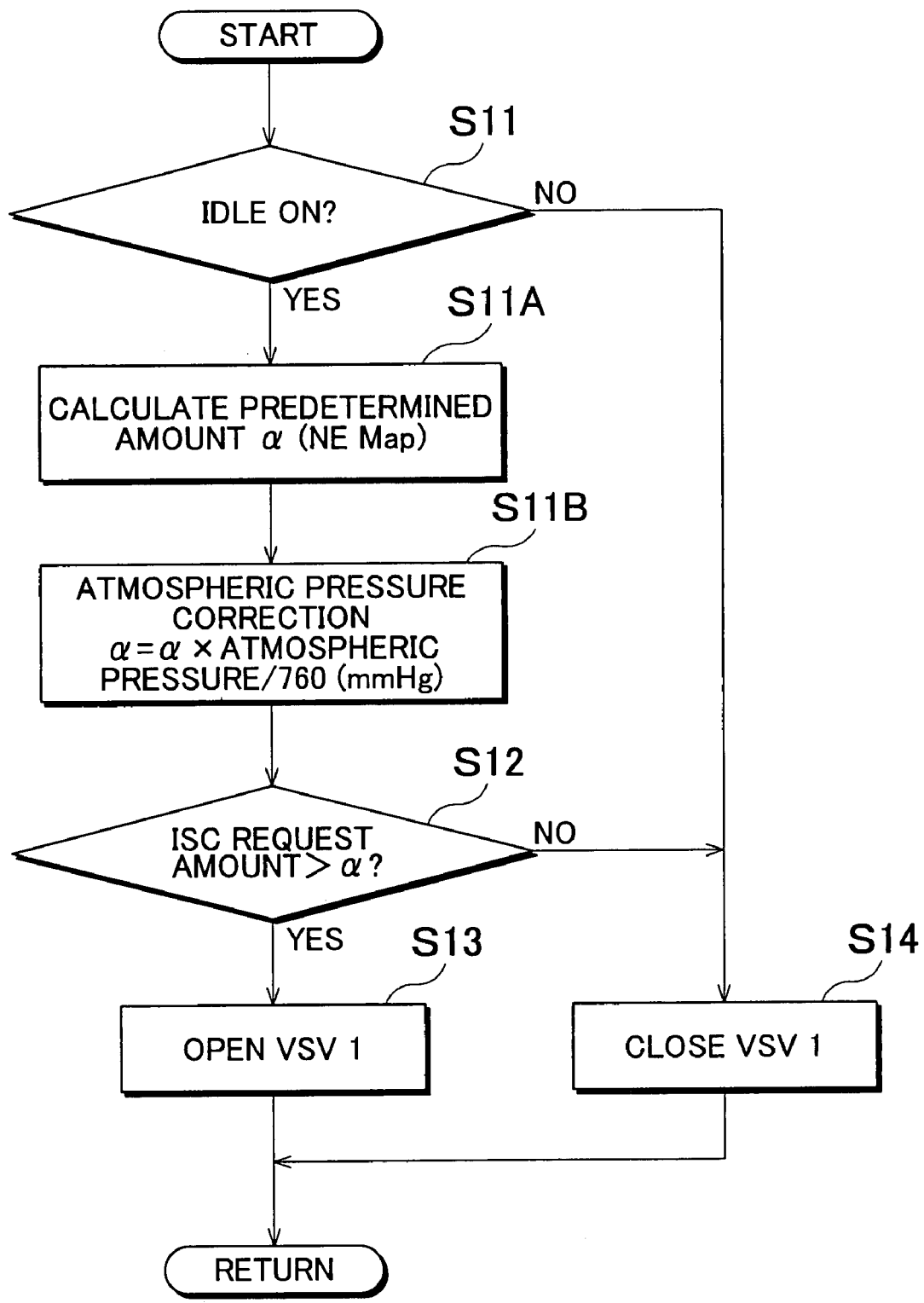
FIG. 6 is a flowchart showing a process performed by an ECU 40C.

Next, a process executed by the ECU 40C in causing the ejector 30 to more suitably function so as to secure a sufficient magnitude of the booster negative pressure during idling will be described with reference to the flowchart shown in FIG. 6. The flowchart shown in FIG. 6 is the same as the flowchart shown in FIG. 4, except that step 11B is added. In the following description of this embodiment, only step 11B will be described in detail. Subsequently to step 11A, the CPU executes a process of correcting the predetermined amount α in accordance with the atmospheric pressure (step 11B). It is to be noted herein that when the atmospheric pressure is low, the pressure difference across the throttle valve 13a is small. Furthermore, if the pressure difference is small, the negative pressure that can be generated by the ejector 30 is correspondingly small. Therefore, when the atmospheric pressure is low, it is more preferable to open the VSV 1 in a stage where the ISC request amount is relatively small, in view of securing a sufficient magnitude of the booster negative pressure.

Therefore, concretely in this embodiment, the ratio between the detected atmospheric pressure and the standard atmospheric pressure 760 mmHg is multiplied by the predetermined amount α calculated in step 11A to calculate a new predetermined amount α. In this manner, the predetermined amount α is corrected in accordance with the magnitude of the atmospheric pressure. Therefore, in step 12, the determination using the corrected predetermined amount α is made, so that the booster negative pressure is secured more suitably. Thus, it is possible to realize the vehicular ejector system 100C capable of reducing the cost of the vehicle and also capable of causing the ejector 30 to more suitably function in securing a sufficient magnitude of the booster negative pressure.

Embodiment 4

Figure 7:
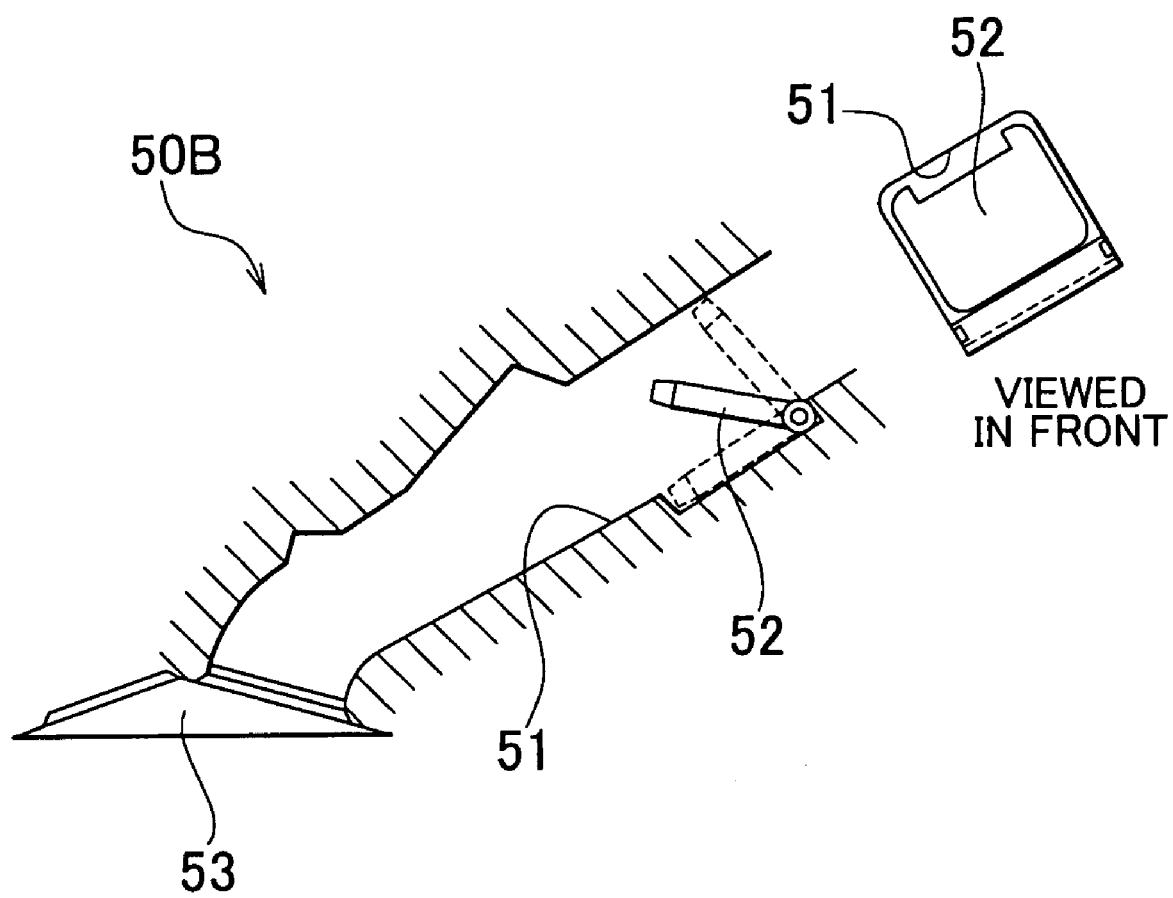
FIG. 7 is a schematic diagram showing an air flow control valve 52 together with an intake port 51.

An ejector system 100D in accordance with this embodiment is the same as the ejector system 100A in accordance with Embodiment 1, except that the ejector system 100D has an ECU 40D in place of the ECU 40A. The vehicular constructions to which the ejector system 100D is applied are the same as the constructions shown in FIG. 1 except for the ECU 40A and the internal combustion engine 50A. An internal combustion engine 50B in this embodiment has an air flow control valve 52 in an intake system 10, more concretely, in an intake port 51. FIG. 7 is a schematic diagram showing the air flow control valve 52 together with the intake port 51. The air flow control valve 52 is a component provided for causing a strong turning air flow within a combustion chamber 53. In this embodiment, the air flow control valve 52 is a constructed for causing a strong tumble flow. However, this is not restrictive. The air flow control valve 52 may also be a component for causing a swirl flow, an oblique tumble flow formed by combination of a tumble flow and a swirl flow, etc. in the combustion chamber 53.

Furthermore, a control valve opening degree sensor (not shown) for detecting the degree of opening of the air flow control valve 52 is connected to the ECU 40D. The ECU 40D is the same as the ECU 40A, except that a third predetermined amount correction-purpose program for correcting the predetermined amount α in accordance with the opening degree of the air flow control valve 52 detected on the basis of the output signal of the control valve opening degree sensor is stored in the ROM. In this embodiment, the CPU and the like and the third predetermined amount correction-purpose program may realize a third predetermined amount correction portion, and the VSV 1, the ejector 30 and the ECU 40D may realize the ejector system 100D.

Figure 8:
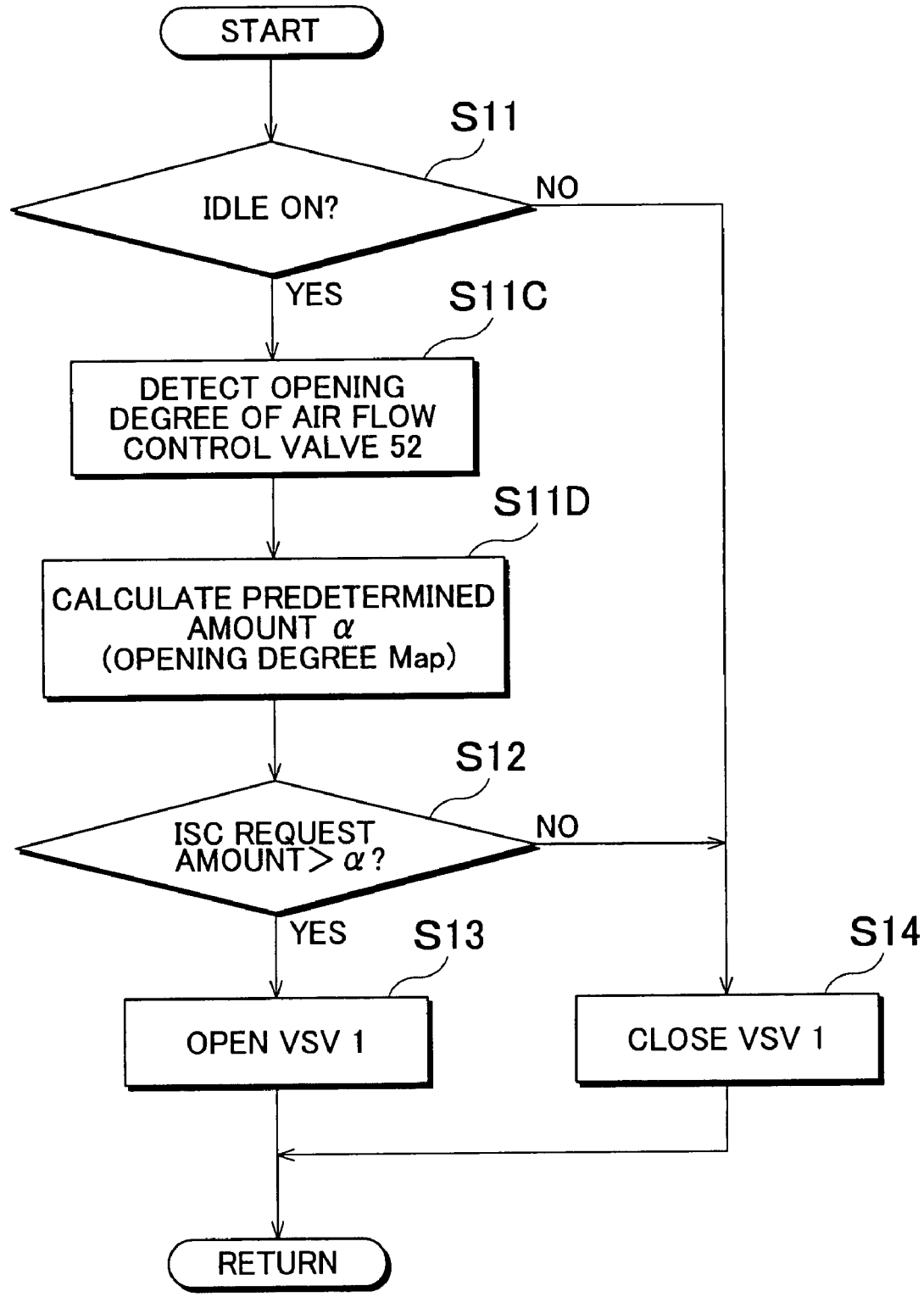
FIG. 8 is a flowchart showing a process performed by an ECU 40D.

Next, a process executed by the ECU 40D in causing the ejector 30 to more suitably function so as to secure a sufficient magnitude of the booster negative pressure during idling will be described with reference to the flowchart shown in FIG. 8. The flowchart shown in FIG. 8 is the same as the flowchart shown in FIG. 3, except that steps 11C and 11D are added. In the following description of this embodiment, only steps 11C and 11D will be described in detail. If an affirmative determination is made in step 11, the CPU executes a process of detecting the opening degree of the air flow control valve 52 (step 11C). It is to be noted herein that if the opening degree of the air flow control valve 52 changes, the intake manifold negative pressure also changes. Furthermore, in this embodiment, the throttle valve 13a is designed so as to operate in cooperation with the opening degree of the air flow control valve 52 during idling. Concretely, if the air flow control valve 52 operates in the closing direction, the intake air flow amount supplied to the internal combustion engine 50D correspondingly declines, and the throttle valve 13a is operated in the opening direction so as to supplement the intake air flow amount. Therefore, in the case where the air flow control valve 52 is fully closed, the intake manifold negative pressure declines more greatly than in the case where the air flow control valve 52 is fully open.

Figure 9:
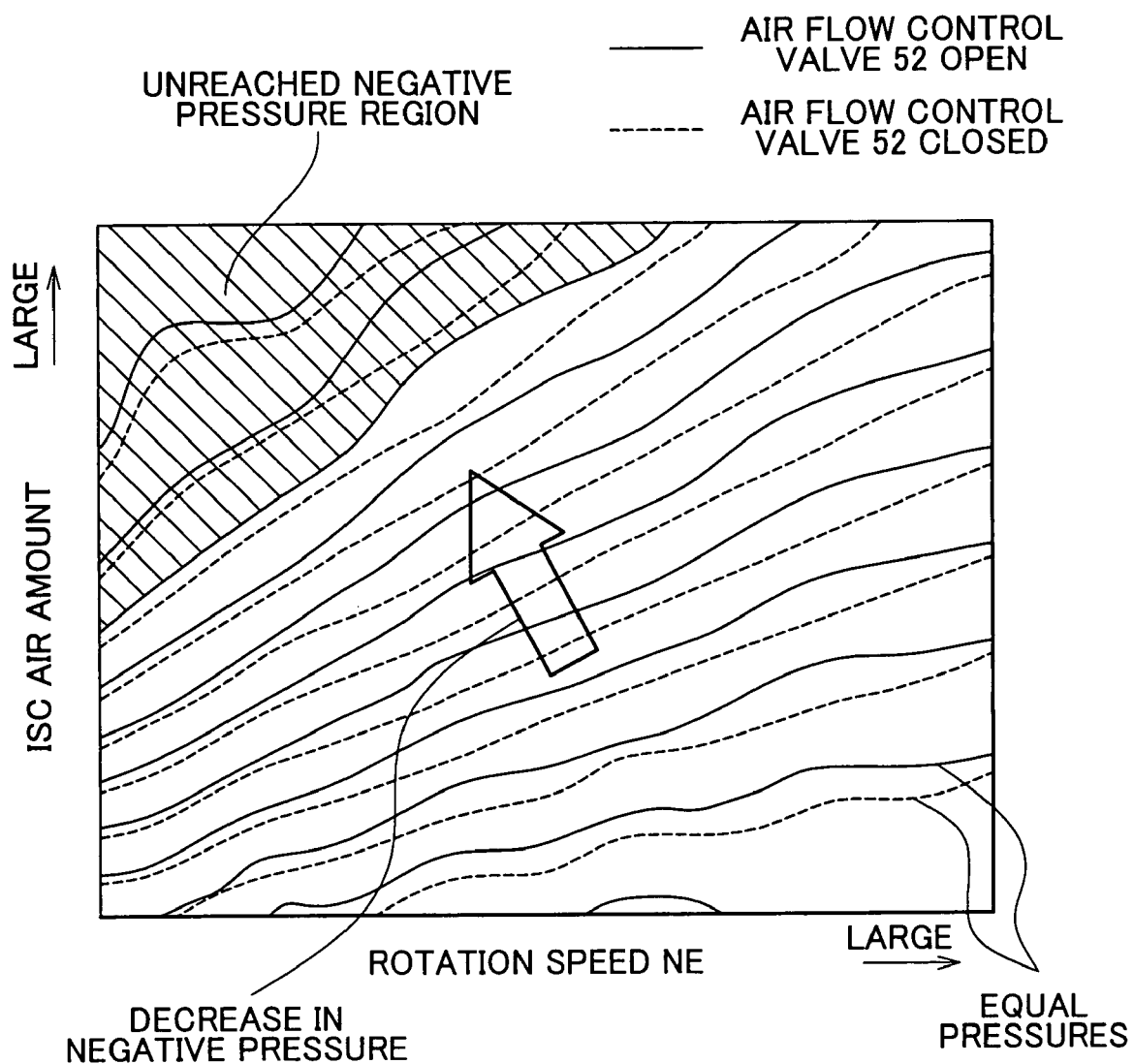
FIG. 9 is a schematic diagram showing the intake manifold negative pressure when the air flow control valve 52 is fully closed and when it is fully open, in a relationship with the rotation speed NE and the ISC air amount.

FIG. 9 is a schematic diagram showing the intake manifold negative pressure when the air flow control valve 52 is fully closed and when it is fully open, in a relationship between the rotation speed NE and the ISC air amount. That is, the diagram of FIG. 9 is formed by superimposing a diagram for the fully open state of the air flow control valve 52 and a diagram for the fully closed state thereof on each other. Incidentally, the ISC air amount is a quantity of state that changes similarly to the ISC control amount in accordance with the ISC control amount, and the rotation speed NE is shown in the range of 1000 rpm including the idle rotation speed. An unreached negative pressure region shown in an upper left portion of the diagram indicates a region of the intake manifold negative pressure where the magnitude of the booster negative pressure greater than a reference value cannot be secured. As can be seen in FIG. 9, contour lines of the intake manifold negative pressure are shifted leftward in the drawing in the case where the air flow control valve 52 is fully open, in comparison with the case where the air flow control valve 52 is fully closed. This indicates that the intake manifold negative pressure is lower when the air flow control valve 52 is fully closed than when it is fully open provided that the rotation speed remains the same and the ISC air amount also remains the same. Therefore, when the air flow control valve 52 is fully closed, it is more preferable to open the VSV 1 in a stage where the ISC request amount is relatively small, in view of securing a sufficient magnitude of the booster negative pressure.

Figure 10:
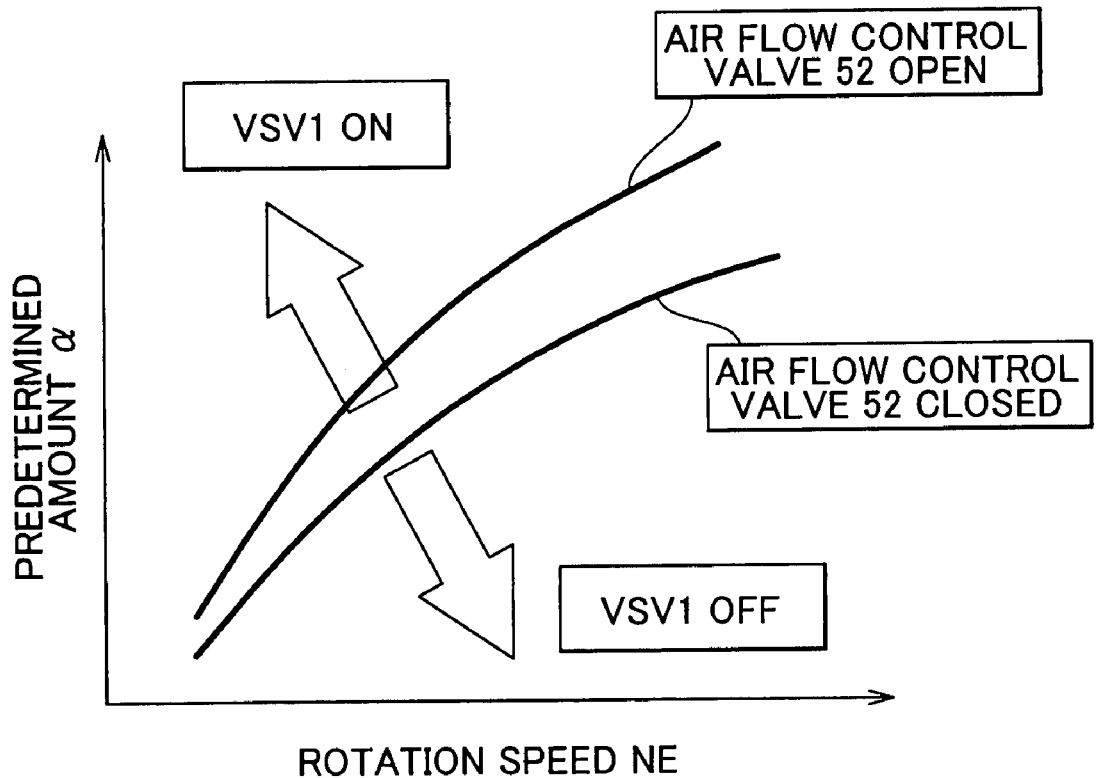
FIG. 10 is a schematic diagram showing map data (an opening degree map) of a predetermined amount α.

Therefore, in this embodiment, the predetermined amount α is corrected as described below. FIG. 10 is a schematic diagram showing map data of the predetermined amount α set in accordance with the opening degree of the air flow control valve 52 (hereinafter, also referred to simply as "opening degree map"). This opening degree map is formed by preparing NE maps as shown in FIG. 5 separately for the case where the air flow control valve 52 is fully closed and the case where it is fully open, and then superimposing them on each other. The opening degree map is stored in the ROM, and the predetermined amount α is set in the opening degree map in accordance with the opening degree of the air flow control valve 52 (in accordance with the case of the fully closed state and the case of the fully open state). Furthermore, in the opening degree map, the predetermined amount α is set smaller when the air flow control valve 52 is fully closed than when it is fully open. Therefore, in step 11D, as a process of calculating the predetermined amount α, the CPU refers to the opening degree map on the basis of the opening degree of the air flow control valve 52 detected in step 11C, so that the predetermined amount α is corrected in accordance with the opening degree of the air flow control valve 52. Therefore, in step 12, the determination using the corrected predetermined amount α is performed, so that the booster negative pressure is secured more suitably. Although this embodiment has been described in conjunction with the case where the air flow control valve 52 is fully closed and the case where it is fully open, the predetermined amount α may also be corrected in substantially the same manner when the air flow control valve 52 is in a state between the fully open state and the fully closed state. Thus, it is possible to realize the vehicular ejector system 100D capable of reducing the cost of the vehicle and also capable of causing the ejector 30 to more suitably function in securing a sufficient magnitude of the booster negative pressure.

Embodiment 5

An ejector system 100E in accordance with this embodiment is the same as the ejector system 100A in accordance with Embodiment 1, except that the ejector system 100E has an ECU 40E in place of the ECU 40A. The vehicular constructions to which the ejector system 100E is applied are the same as the constructions shown in FIG. 1 except for the ECU 40A. The ECU 40E is the same as the ECU 40A, except that a control prohibition-purpose program for prohibiting the VSV 1 from being controlled so as to cause the ejector 30 to function when the water temperature of the cooling water of the internal combustion engine 50 detected on the basis of the output signal of the water temperature sensor is less than or equal to a predetermined temperature T is also stored in the ROM. In this embodiment, the CPU and the like and the control prohibition-purpose program may realize a control prohibition portion, and the VSV 1, the ejector 30 and the ECU 40E may realize the ejector system 100E.

Figure 11:
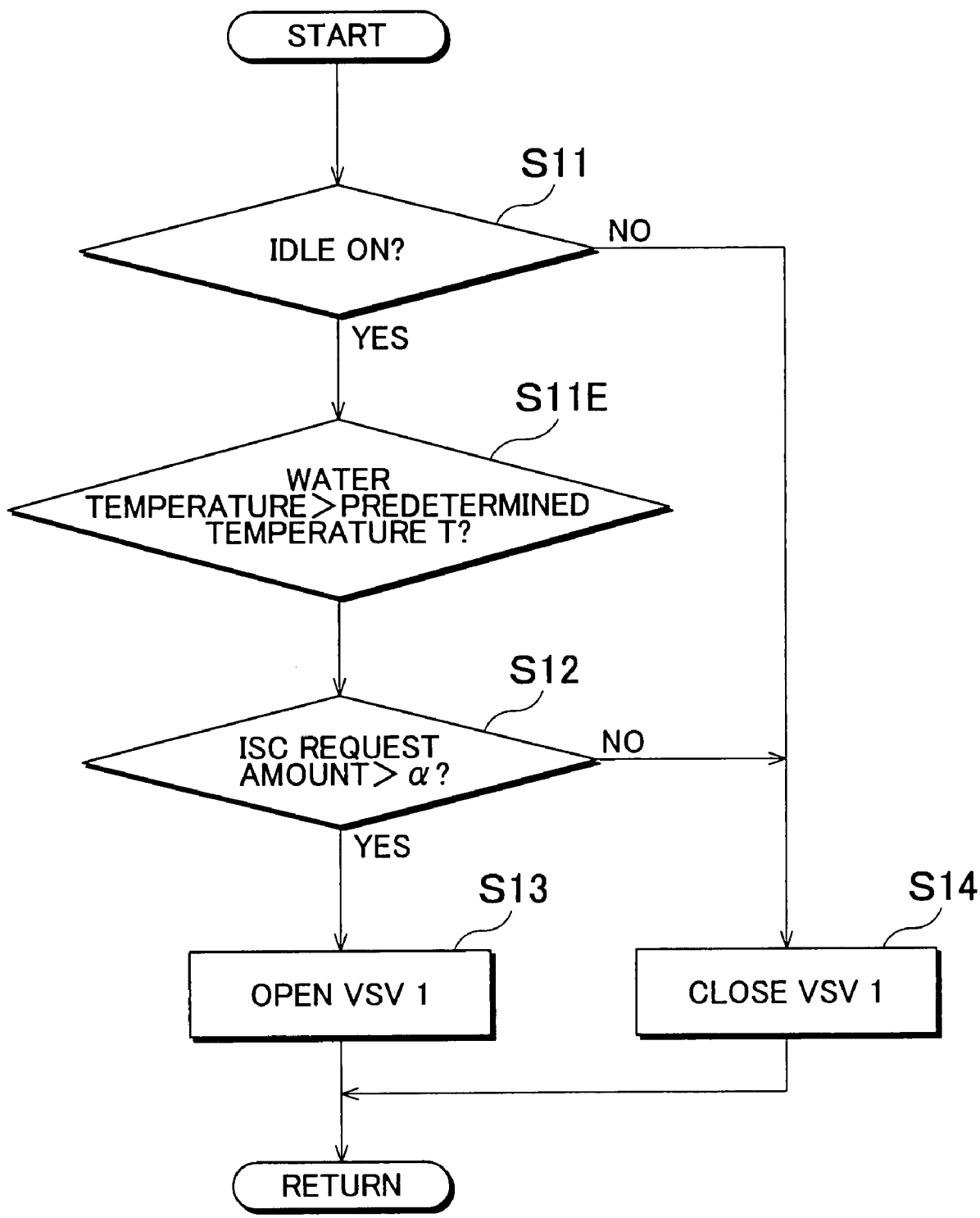
FIG. 11 is a flowchart showing a process performed by an ECU 40E.

Next, a process executed by the ECU 40E in prohibiting the VSV 1 from being controlled so as to cause the ejector 30 to function when the water temperature of the cooling water of the internal combustion engine is less than or equal to the predetermined temperature T will be described with reference to the flowchart of FIG. 11. The flowchart shown in FIG. 11 is the same as the flowchart shown in FIG. 3, except that step 11E is added. In the following description of this embodiment, only step 11E will be described in detail. If an affirmative determination is made in step 11, the CPU executes a process of determining whether or not the water temperature of the cooling water of the internal combustion engine is higher than the predetermined temperature T, that is, less than or equal to the predetermined temperature T (step 11E). It is to be noted herein that condensation is likely to occur and freeze in the negative pressure extraction portion 32c since the high-speed jet flow reduces temperature. Furthermore, since the negative pressure extraction portion 32c is constricted to a small opening size, the freezing is likely to make a clog that impedes the function of the ejector 30.

On the other hand, if freezing is present, the ejector 30 cannot be caused to function until the freezing disappears. Therefore, in this embodiment, as a sufficient temperature for disappearance of freezing, the predetermined temperature T is set at a suitable temperature (e.g., 70° C.) for the internal combustion engine 50E. If the water temperature of the cooling water of the internal combustion engine is less than or equal to the predetermined temperature T, the ejector 30 is caused not to function. Therefore, undesirable effects that occur in the case where the ejector 30 actually does not function due to freezing can be prevented. Thus, it is possible to realize the vehicular ejector system 100E capable of reducing the cost of the vehicle and also capable of preventing undesired effects that would otherwise occur when the ejector 30 actually does not function due to the freezing.

The foregoing embodiments are preferred embodiments of the invention. However, the invention is not limited to these embodiments, but may be carried out with various modifications without departing from the sprit of the invention.

What is claimed is:

1. A control method of a vehicular ejector system including an ejector that generates a negative pressure that is greater than the negative pressure that is to be extracted from an intake passageway of an intake system of the internal combustion engine; a state change device that causes the ejector to function or stop functioning; and a control device that controls the state change device, the control method comprising:
   determining whether or not an idle control is being performed in the internal combustion engine;
   determining whether or not an idle speed control request amount used to adjust an intake air flow amount supplied to the internal combustion engine during idling is greater than a predetermined value if the idle control is being performed; and
   controlling the state change device so as to cause the ejector to function if the idle speed control request amount is greater than the predetermined value.

2. A vehicular ejector system comprising:
   an ejector that generates a negative pressure that is greater than the negative pressure that is to be extracted from an intake passageway of an intake system of the internal combustion engine;
   a state change device that causes the ejector to function or stop functioning; and
   a control device that controls the state change device,
   wherein when an idle speed control request amount for controlling a flow amount adjustment device that adjusts an intake air flow amount supplied to the internal combustion engine during idling is greater than a predetermined amount, the control device controls the state change device so as to cause the ejector function.

3. The vehicular ejector system according to claim 2, wherein the control device has a control prohibition portion that prohibits the state change device from being controlled so as to cause the ejector to function if water temperature of a cooling water of the internal combustion engine is less than or equal to a predetermined temperature.

4. The vehicular ejector system according to claim 2, wherein the control device has a predetermined amount correction portion that corrects the predetermined amount in accordance with a condition for a change in the magnitude of the negative pressure to be extracted from the intake passageway although a state of the flow amount adjustment device remains the same.

5. The vehicular ejector system according to claim 4, wherein the condition is based on the magnitude of atmospheric pressure.

6. The vehicular ejector system according to claim 4, wherein the condition is based on opening degree of an air flow control valve that is disposed in the intake passageway of the intake system of the internal combustion engine.

7. The vehicular ejector system according to claim 4, wherein the condition is based on rotation speed of the internal combustion engine.

8. The vehicular ejector system according to claim 7, wherein the condition is based on the magnitude of atmospheric pressure.

* * * * *